United States Patent [19]

Decker et al.

[11] Patent Number: 4,793,591
[45] Date of Patent: Dec. 27, 1988

[54] HYDRAULIC SHEAR SEAL VALVE INCLUDING SLIDE BEARING

[75] Inventors: Arnold F. Decker, Aurora; Roy Reynolds, Crystal Lake, both of Ill.

[73] Assignee: Templeton, Kenly & Co., Broadview, Ill.

[21] Appl. No.: 131,757

[22] Filed: Dec. 11, 1987

[51] Int. Cl.⁴ .................... F16K 11/065; F16K 25/00; F16K 31/02
[52] U.S. Cl. ................... 251/172; 137/625.18; 137/625.25; 137/625.48; 251/129.07; 251/129.15; 251/129.2; 251/174; 251/325
[58] Field of Search ............... 137/625.18, 625.25, 137/625.48; 251/172, 174, 324, 325, 129.07, 129.15, 129.2, 282

[56] References Cited

U.S. PATENT DOCUMENTS

| | | | |
|---|---|---|---|
| 2,925,095 | 2/1960 | Bates | 251/172 |
| 3,432,141 | 3/1969 | Irti et al. | 251/172 |
| 3,482,816 | 12/1969 | Arnold | 251/174 |
| 3,530,893 | 9/1970 | Masuda | 137/625.25 |
| 3,761,054 | 9/1973 | Abdo | 251/172 |
| 3,776,276 | 12/1973 | Stiltner | 137/625.48 |
| 4,372,531 | 2/1983 | Rollins et al. | 251/174 |

FOREIGN PATENT DOCUMENTS

| | | | |
|---|---|---|---|
| 8922 | 3/1956 | Fed. Rep. of Germany | 137/625.48 |
| 813057 | 5/1959 | United Kingdom | 251/172 |

*Primary Examiner*—George L. Walton
*Attorney, Agent, or Firm*—Michael, Best & Friedrich

[57] ABSTRACT

A shear seal valve includes a valve body defining an interior valve chamber and a slide member axially movable in the valve chamber. Fluid passages, formed in the valve body and the slide, are selectively interconnected in accordance with the relative position of the slide member within the valve chamber, and tubular shear seals, biased tightly against the slide, avoid fluid leakage along the slide. To provide low-friction sliding movement of the slide relative to the slide body, a pair of roller bearings are supported by the valve body so as to engage the slide. By mounting the roller bearings to the valve body rather than to the slide itself, the slide can be made smaller, and greater freedom in the location of the fluid passages within the slide is obtained. To simplify construction and assembly, the roller bearings are mounted in a removable cover plate forming a part of the valve body and defining one wall of the interior valve chamber. Preferably, the tubular shear seals include frusto-conically shaped flanges for limiting movement of the seals and for avoiding the development of cocking forces on the seals.

12 Claims, 2 Drawing Sheets

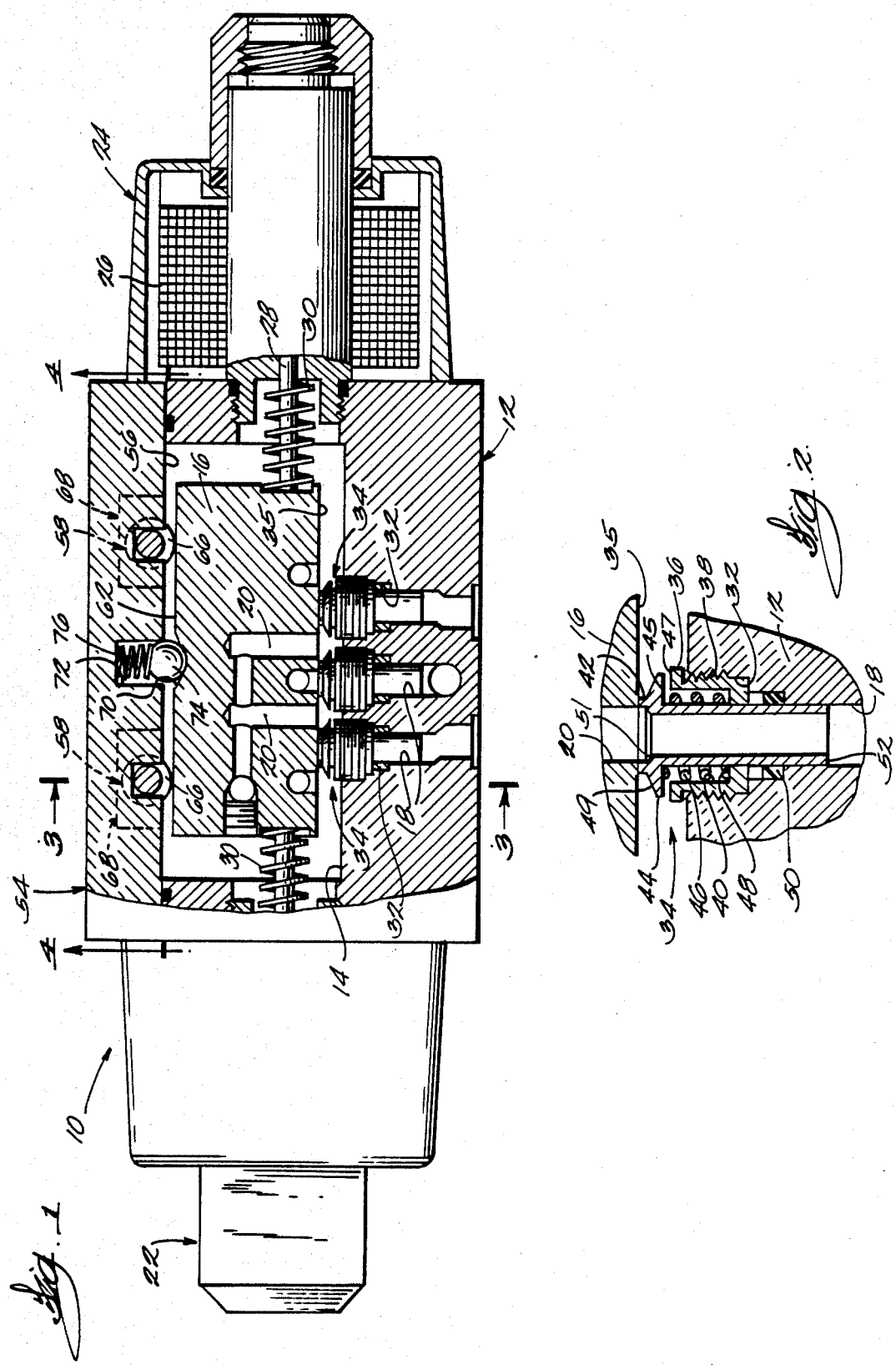

HYDRAULIC SHEAR SEAL VALVE INCLUDING SLIDE BEARING

BACKGROUND OF THE INVENTION

This invention relates generally to valves for controlling fluid flow and, more particularly, to shear seal valves for controlling the flow of pressurized hydraulic fluid.

Shear seal valves are typically used in fluid pressure systems to control fluid flow and commonly include a valve body having a central chamber housing a reciprocable slide. Generally, the slide is axially movable between different positions within the valve body so as to control fluid flow through passages formed in both the valve body and the slide itself. Fluid leakage is prevented by means of tubular shear seals which are housed in ports formed in either the valve body or the slide. Such shear seals include flat, sealing, end faces which slideably engage either the slide or the valve body as the valve is operated. Various known shear seals rely on the force developed by the pressurized hydraulic fluid itself to help bias the shear seal tightly against the adjacent valve body or slide so as to assure a tight seal and thereby avoid fluid leakage.

The fluid pressure forces forcing the shear seals against the opposed flat faces of the valve body or slide can restrict relative movement between the valve body and slide and thereby increase the actuating force necessary to operate the valve. This is particularly true in high pressure hydraulic systems where fluid pressures as high as 10,000 lbs. per square inch (psi) can be encountered. Low slide forces are necessary where valves are actuated automatically by electrically operated solenoids, and use of electrically actuated valves has increased significantly because of computer controlled or remote controlled manufacturing operations. Prior shear seal valve designs have, therefore, sought to minimize sliding friction between the slide and the valve body while simultaneously allowing substantial contact forces to be developed between the shear seals and the slide or valve body so as to minimize fluid leakage. Typically, this has been achieved by utilizing some sort of bearing arrangement to support the slide in the shear seal valve housing.

One example of a prior bearing arrangement for supporting a slide in a shear seal valve is shown in U.S. Pat. No. 3,761,054 to Abdo which issued Sept. 25, 1973. As therein illustrated, a slide is supported by means of four disk-shaped bearing assemblies mounted to the ends of a pair of axles extending through each end of the slide. Although effective in reducing friction, the mounting of the bearings to the slide increased the length of the slide as well as the overall size of the resulting shear seal valve.

In view of the foregoing, it is a general object of the present invention to provide a new and improved shear seal valve.

It is a more specific object of the present invention to provide a new and improved shear seal valve that is suitable for use in high pressure hydraulic systems and which can be reliably actuated through use of relatively small actuating forces.

It is a still more specific object of the present invention to provide a new and improved shear seal valve that is compact and easily manufactured.

SUMMARY OF THE INVENTION

The invention provides a shear seal valve comprising a valve body defining an interior valve chamber, an elongate slide member within the valve chamber and axially movable relative to the valve body, and bearing means supported by the valve body and engaging the slide member for supporting the slide member for low-friction sliding movement within the valve body.

The invention also provides a control valve comprising a valve body having an elongate chamber including inlet and outlet fluid passages, and a slide shiftable longitudinally in the elongate chamber. The slide includes passages therethrough arranged to provide communication with the inlet and outlet fluid passages when the passages in the slide are aligned with the inlet and outlet fluid passages in the valve body. One of the valve body or the slide has a flat face through which the passages open, and the other of the valve body or the slide carries at least one tubular metallic shear seal. The tubular metallic shear seal includes an annular flat end face slideably and sealingly engaging the flat face of the valve body or the slide. The control valve further comprises means for supporting the slide for low-friction movement in the valve body, the means for supporting the slide including at least a pair of bearing means supported by the valve body and engageable with the slide.

The invention also provides a tubular shear seal assembly for use in a shear seal valve having a valve body and slide movable in the valve body. The tubular shear seal assembly includes a collar portion adapted to be received in one of the valve body and the slide and having a central bore. A tubular shear seal is telescopingly received in the central bore, and means are provided for limiting telescoping movement of the tubular shear seal inwardly into the central bore. Additional means are provided for biasing the tubular shear seal outwardly from the collar portion and toward the other of the valve body and the slide.

In one embodiment, the bearings comprise rollers rotatably supported by the valve body.

In one embodiment, the slide includes a pair of planar sides, one of the planar sides being positioned in opposed relation to the inlet and outlet fluid passages, and the other of the opposed sides including a planar surface engaged by the bearings.

In one embodiment, a pair of rollers are provided for supporting opposite ends of the slide.

In one embodiment, the valve body includes a removable cover plate and the bearings are mounted in the removable cover plate.

In one embodiment, a frusto-conically shaped flange formed adjacent the upper end of the tubular shear seal limits movement of the tubular shear seal into the central bore and functions to help disperse fluid as the shear seal moves into registry with a fluid passage in the valve body or slide.

A principal feature of the present invention is the provision of a shear seal valve wherein an axially movable slide is supported by means of bearings mounted in a relatively stationary valve body.

Another principal feature of the present invention is the provision of a shear seal valve wherein the need for mounting bearings on an axially movable slide is eliminated so that the slide can be made relatively smaller and so that the arrangement of fluid passages through the slide is unaffected by the need to provide for the mounting of separate bearings to the slide.

Still another principal feature of the present invention is to provide a shear seal valve wherein roller bearings for supporting an axially movable slide are mounted in a removable cover plate of a relatively stationary valve body so that the rollers can be first mounted in the cover plate and the cover plate then mounted to the valve body.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a side elevational view, partially in section, of a shear seal valve embodying various features of the invention.

FIG. 2 is an enlarged, fragmentary, cross-sectional view of a tubular shear seal included in the shear seal valve shown in FIG. 1.

DESCRIPTION OF THE PREFERRED EMBODIMENT

Figure 3:
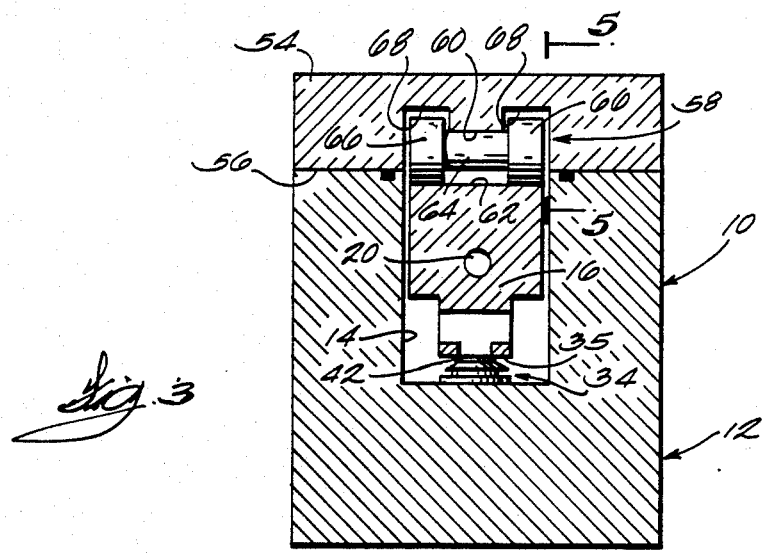
FIG. 3 is a cross-sectional view taken along line 3—3 in FIG. 1.

Illustrated in FIG. 1 is a shear seal valve 10 embodying the invention and including a valve body 12 having a generally rectangular valve chamber 14 housing a shiftable slide 16 supported in the chamber 14 for reciprocable movement therein. In the illustrated arrangement, the slide 16 is rectangular and has a cross-sectional configuration complementary to the cross-sectional configuration of the valve chamber 14. The valve body 12 also includes a plurality of fluid passages 18, and the slide 16 includes complementary fluid passages 20 adapted to provide for fluid flow between the valve body passages 18 when the slide 16 is positioned in the valve chamber 14 so as to provide registry between the passages 18 in the valve body 12 and the passages 20 in the slide 16.

The fluid passages 18 and 20 in the valve body 12 and the slide 16 are arranged so as to satisfy the intended requirements or applications for the valve 10, and it will be understood by those skilled in the art that the fluid passage and porting arrangements shown in the drawings are illustrated merely by way of example and are not intended to be limiting. Actuating means are provided for causing selective movement of the slide 16 in the valve chamber 14. While the actuating means could have other constructions, in the illustrated arrangement, a pair of electrically actuated solenoids 22 and 24 are operably connected to opposite ends of the valve body 12. Each solenoid 22 and 24 includes a winding 26 and a plunger 28 operably engageable with an end of the slide 16. Electrical actuation of the solenoid causes the plunger 28 to apply a force on the slide 16 to shift the slide 16 in a direction away from the end of the valve body 12 nearest the solenoid 22 or 24. Each solenoid 22 and 24 also includes a compression spring 30 engaging one of the opposed ends of the slide 16 so as to center the slide 16 when electrical power to the solenoids is interrupted.

Means are also provided for forming a fluid-tight seal between the passages 18 and 20 in the valve body 12 and the slide 16 to thereby prevent leakage of hydraulic fluid between the valve body 12 and the slide 16. In the illustrated arrangement, each passage 18 in the valve body 12 terminates in a port 32 having therein mounted a tubular shear seal assembly 34. Each shear seal assembly 34 is adapted to sealingly engage a flat face 35 of the slide 16 to prevent the longitudinal flow of fluid through the valve chamber 14 along the slide 16 when the valve 10 is closed, and is also adapted to confine the flow of fluid to the path between the valve body passages 18 and the slide fluid passages 20 when the valve is open.

In the illustrated arrangement, each shear seal assembly 34 includes a threaded collar portion 36 threaded into a threaded bore 38 formed in the port 32. The collar includes a central bore 40 housing a tubular shear seal 42 for limited sliding, telescoping movement toward and away from the opposed flat face 35 of the slide 16. Each shear seal 42 also includes a flange 44 surrounding an end of the shear seal, and a compression spring 46 is provided between an internal shoulder 48 of the collar 36 and the flange 44 of the tubular shear seal 42 to bias the tubular shear seal 42 into engagement with the flat surface 35. An O-ring seal 50 surrounds a lower end of the tubular shear seal 42 and provides a fluid-tight seal between the periphery of the tubular shear seal 42 and the periphery of the passage 18.

During operation of the valve 10, hydraulic fluid pressure on the end surface 52 of the tubular shear seal 42 biases the shear seal 42 into engagement with the opposed flat face 35 of the slide 16. In a preferred form of the invention, the force of the hydraulic pressure on the shear seal 42 should be balanced such that the force of the tubular shear seal 42 on the flat surface 35 of the slide 16 is sufficient to cause a sealing engagement between the shear seal 42 and the flat surface 35, but not so great as to prevent movement of the slide 16 in the valve chamber 14.

In the illustrated engagement the flange 44 surrounding the end of the shear seal includes a shoulder surface 45 adapted to engage an opposed end surface 47 of the collar 36, the flange 44 thus providing a means for limiting the relative movement of the tubular shear seal 42 in the collar and thereby limiting the compression of the compression spring 46.

During operation of the shear seal valve wherein the slide 16 is moved to a position wherein hydraulic fluid flows from the port 20 through the shear seal valve into port 18, the initial force of the hydraulic fluid on the tubular shear seal will force the seal into the collar and thereby compress the spring 46. Excessive compression of the spring 46 can reduce the effectiveness of the spring. The provision of the flange 44 prevents excessive compression of the spring 46 and prolongs its useful life.

In a preferred form of the invention the flange 44 of the tubular shear seal includes a sloped or frusto-conical surface portion 49 facing the flat surface 35 of the slide 16 and extending from the periphery of the tubular shear seal to the cylindrical end portion of the shear seal having a face engaging the face 35 of the slide 16. During movement of the slide 16 toward the position wherein port 20 is in registry with the shear seal, hydraulic fluid will flow from the port 20 around the end of the shear seal 42. The conical surface portion 49 of the flange 44 facilitates flow or dispersal of the hydraulic fluid around the shear seal and thereby reduces the force on the shear seal resulting from flow of hydraulic fluid around the shear seal and also minimizes the lateral force on the shear seal 42 tending to cause it to be cocked in the collar 36.

In those cases where electrically actuated solenoids 22 and 24 are provided for causing movement of the slide 16, it is important that the slide 16 move freely and that undue frictional resistance between the shear seals 42 and the slide 16 be avoided. This is particularly true when commonly available solenoids are used, as the force generated by such solenoids can be limited by the extent of the solenoid stroke and can be as little as four to fifteen pounds. In the illustrated arrangement, the hydraulic force on the tubular shear seal 42 can be balanced by the provision of an internal shoulder 51 having a surface area slightly smaller than the surface area of the end 52 of the tubular shear seal 42.

The valve body 12 further includes a cover plate 54 secured to the valve body 12 by suitable fasteners such as machine screws 55. As illustrated, the cover plate 54 includes an internal, generally planar surface 56 defining an internal wall of the cavity or chamber 14 within which the slide 16 is mounted.

Figure 4:
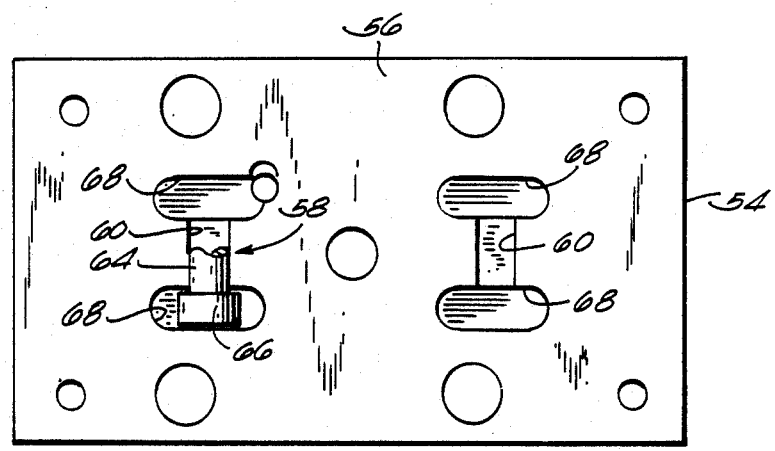
FIG. 4 is a cross-sectional view taken along line 4—4 in FIG. 1.
Figure 5:
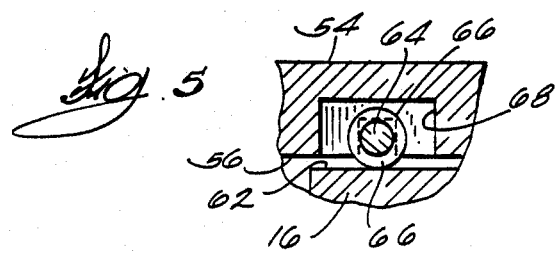
FIG. 5 is an enlarged, fragmentary, cross-sectional view taken along line 5—5 in FIG. 3.

Means are also provided for supporting the slide 16 for free sliding movement in the valve body 12 and for supporting the slide 16 against cocking when hydraulic fluid pressure generates unbalanced forces on the slide 16. The means for supporting the slide 16 includes a pair of roller assemblies 58 housed in recesses 60 (FIGS. 3 and 4) provided in the face 56 of the cover plate 54 and engaging the generally flat (planar) top surface 62 of the slide 16. As best shown in FIGS. 3, 4 and 5, each roller assembly 58 includes an axle 64 housed in the recess 60 in the cover plate 54, the recess 60 having a longitudinal axis perpendicular to the direction of movement of the slide 16 and parallel to the plane of the face 56 of the cover plate 54. As shown in FIGS. 4 and 5, the recess 60 has a width slightly larger than the diameter of the axle 64. Preferably, the recess 60 is sufficiently large to permit rotation of the axle 64 in the recess 60 while preventing canting of the axle 64 with respect to the longitudinal axis of the recess 60. The opposite ends of the axle 64 support rollers or wheels 66 adapted to engage the upper planar surface 62 of the slide 16, and the face 56 of the cove plate 54 is also provided with recesses 68 adapted to house the rollers 66, the recesses 68 being sufficiently large that the rollers 66 are freely rotatable with the axles 64.

In a preferred form of the invention, a pair of roller assemblies 58 are provided and the roller assemblies 58 are spaced apart in the chamber 14 sufficiently that the rollers 66 engage the opposite sides of the slide 16 while maintaining engagement with the slide while the slide is at the opposite ends of its stroke in the valve chamber 14. Additionally, the roller assemblies 58 are positioned on opposite sides of the longitudinal axis defined by the ports 32 of the fluid passages 18. Accordingly, the forces on the slide 16 applied by the hydraulic fluid pressure from the ports 32 will lie between the two rollers 66, and the rollers 66 will prevent canting of the slide 16 within the chamber 14. Additionally, while the length of the axles 64 of the roller assemblies 58 can vary, in a preferred form of the invention, the rollers 66 on the opposite ends of the axles 64 will be spaced apart sufficiently as to prevent canting of the slide 16 about the longitudinal axis of the chamber 14.

In the illustrated arrangement, detent means are also provided for releasably holding the slide 16 in a centered intermediate position. While the detent means could have other constructions, in the illustrated arrangement, a recess 70 is provided in the upper surface 62 of the slide 16. The face 56 of the cover plate 54 includes a recess 72 housing a ball 74 adapted to be received in the recess 70 in the slide 16, and a compression spring 76 is provided for biasing the ball 74 into engagement with the face 62 of the slide 16.

While a particular embodiment of the invention has been shown and described, it will be obvious to those skilled in the art that changes and modifications can be made therein without departing from the invention in its broader aspects, and, therefore, the aim in the appended claims is to cover all such changes and modifications as fall within the true spirit and scope of the invention.

We claim:

1. A shear seal valve comprising:

a valve body defining an interior valve chamber, the valve body including a removable cover plate defining one wall of the interior valve chamber, and the valve body having a wall portion opposite the removable cover plate, the wall portion including inlet and outlet hydraulic fluid passages, and the cover plate including a first recess for housing a first bearing, and a second recess for housing a second bearing, the first recess and the second recess being spaced apart;

a slide member within the valve chamber and axially movable relative to the valve body, the slide member having opposite ends and including hydraulic fluid passages therein arranged to provide fluid communication with the inlet and outlet hydraulic fluid passages in the valve body when the passages in the slide member are aligned with the inlet and outlet fluid passages in the valve body, one of the valve body and the slide member having a flat face through which the passages open and the other of the valve body and the slide member carrying at least one tubular metallic shear seal, the tubular metallic shear seal including an annular flat end face slideably and sealingly engaging the flat face of said one of the valve body and the slide member;

means for supporting the slide member for low-friction movement in the valve body, the means for supporting the slide member including bearing means supported by the cover plate of the valve body, and the bearing means engaging the slide member for supporting the slide member for low-friction sliding movement within the valve body, the bearing means including a first bearing housed in the first recess and a second bearing housed in the second recess, and the first bearing engaging one end of the elongated slide member and the second bearing engaging an opposite end of the slide member.

2. A shear seal valve as set forth in claim 1 wherein the first bearing and the second bearing each include an axle having opposite ends and rollers mounted on the opposite ends of the axle, the axle being supported by the cover plate for rotation and the rollers engaging the slide member for supporting the slide member for movement with respect to the cover plate and the valve body.

3. A shear seal valve as set forth in claim 2 wherein the first recess and the second recess each include a central recess portion housing the axle of a respective one of the first bearing and the second bearing and supporting the axle for rotation, and the first recess and the second recess each including opposite ends defining cavities housing the rollers of the first bearing and the second bearing, the cavities being larger than the rollers such that the rollers are freely rotatable in the cavities.

4. A shear seal valve as set forth in claim 2, wherein the slide member includes opposite planar sides, one planar side being positioned in opposed relation to the inlet and outlet fluid passages and the other planar side including a planar surface engaged by the bearing means.

5. A shear seal valve as set forth in claim 2, wherein the first bearing and the second bearing are spaced apart and engage opposite ends of the slide member whereby the force of the bearings on the slide is substantially outside the fluid passages included in the slide member.

6. A shear seal valve as set forth in claim 5, wherein the shear seal is housed in a valve port formed in the valve body, and the shear seal includes a planar face and is supported for limited telescoping movement in the valve port, the planar face engaging an opposed planar surface of the slide member, the shear seal including an opposite end exposed to fluid pressure forcing the planar face of the shear seal into engagement with the planar surface of the slide member.

7. A shear seal valve as set forth in claim 6 wherein the shear seal includes an outwardly extending flange around the planar face, the flange being adapted to engage the valve port and thereby limit telescoping movement of the shear seal into the valve port.

8. A shear seal valve as set forth in claim 7, wherein the outwardly extending flange includes a sloped, frusto-conically shaped upper surface adapted to disperse hydraulic fluid away from the shear seal as the shear seal moves into registry with one of the passages in the slide member.

9. A control valve comprising:
a valve body having an elongate chamber and inlet and outlet fluid passages;
a slide shiftable longitudinally in said elongate chamber, said slide including passages therethrough arranged to provide communication with said inlet and outlet fluid passages when said passages in the slide are aligned with the inlet and outlet fluid passages in the valve body, said slide including opposite planar sides, one planar side being positioned in opposed relation to said inlet and outlet fluid passages and the other planar side including a planar surface, one of said valve body and said slide having a flat face through which said passages open and the other of said valve body and said slide including a valve port carrying at least one tubular metallic shear seal for limited telescoping movement, said tubular metallic shear seal including an annular flat end face slideably and sealingly engaging said flat face of said one of said valve body and said slide, and said shear seal including an opposite end exposed to fluid pressure forcing said planar face of said shear seal into engagement with said opposed planar surface,
means for supporting said slide for low-friction movement in the valve body, said means for supporting said slide including at least a pair of rollers supported by said valve body and engageable with said other planar side of the slide,
said rollers being rotatably supported by axles, said rollers being spaced apart and engaging opposite ends of said slide whereby the force of the rollers on said slide is substantially outside said passages included in said slide,
said valve body including a removable cover plate, said cover plate including a surface portion defining one wall of said elongate chamber, said surface portion including spaced apart cavities housing said rollers, said cavities including grooves supporting said axles; and
said shear seal including an outwardly extending flange around said planar face, said flange being adapted to engage said port and thereby limit telescoping movement of said shear seal into said port,
said outwardly extending flange including a sloped, frusto-conically shaped upper surface adapted to disperse hydraulic fluid away from said shear seal as said shear seal moves into registry with one of said passages in said slide.

10. A tubular shear seal assembly for use in a shear seal valve having a valve body and a slide movable in the valve body, said tubular shear seal assembly comprising:
a collar portion adapted to be received in one of the valve body and the slide and having a central bore;
a tubular shear seal telescopingly received in said central bore;
means for limiting telescoping movement of said tubular shear seal inwardly into said central bore; and
means for biasing said tubular shear seal outwardly from said collar portion and toward the other of the valve body and the slide,
said tubular shear seal including an upper end adapted to engage the other of the valve body and the slide and wherein said means for limiting telescoping movement of said tubular shear seal inwardly into said central bore comprises an annular flange formed around said upper end of said tubular shear seal, and
said annular flange including a frusto-conically shaped upper surface adapted to disperse hydraulic fluid away from said tubular shear seal when said tubular shear seal moves toward registry with a fluid passage formed in the other of the valve body and the slide.

11. A tubular shear seal assembly in accordance with claim 10 wherein said collar portion is adapted to be threadedly received in a port formed in either of the valve body or the slide.

12. A shear seal valve comprising:
a valve body having an interior valve chamber;
a slide housed in the valve chamber and the valve body;
a collar portion adapted to be received in one of the valve body and the slide and having a central bore;
a tubular shear seal telescopingly received in central bore;
means for limiting telescoping movement of said tubular shear seal inwardly into said central bore; and
means for biasing said tubular shear seal outwardly from said collar portion and toward the other of the valve body and the slide,
said tubular shear seal including an upper end adapted to engage the other of the valve body and the slide and wherein said means for limiting telescoping movement of said tubular shear seal inwardly into said central bore comprises an annular flange formed around said upper end of said tubular shear seal, and said annular flange including a frusto-conically shaped upper surface adapted to disperse hydraulic fluid away from said tubular shear seal when said tubular shear seal moves toward registry with a fluid passage formed in the other of the valve body and the slide.

* * * * *